(12) United States Patent
Fukuda

(10) Patent No.: US 6,295,002 B1
(45) Date of Patent: Sep. 25, 2001

(54) BATTERY VOLTAGE DISPLAY APPARATUS FOR WIRELESS COMMUNICATION SYSTEM

(75) Inventor: Kazuko Fukuda, Nagaokakyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/522,182

(22) Filed: Mar. 9, 2000

(30) Foreign Application Priority Data

May 24, 1999 (JP) .................................................. 11-143953

(51) Int. Cl.[7] .................................................. G08B 21/00
(52) U.S. Cl. .......................... 340/636; 340/531; 340/534; 341/23; 348/563; 348/564; 348/569
(58) Field of Search ..................................... 340/636, 531, 340/534, 539; 341/23; 348/563, 564, 569

(56) References Cited

FOREIGN PATENT DOCUMENTS

| 02054322 | * | 8/1988 | (JP) . |
| 6153268 | | 5/1994 | (JP) . |
| 6245281 | | 9/1994 | (JP) . |
| 9331585 | | 12/1997 | (JP) . |

* cited by examiner

Primary Examiner—Julie Lieu

(57) ABSTRACT

When bidirectional wireless communication has been established between a controller section, a system main section transmits an instruction to the controller section to detect a remaining power of a battery. The system main section designates a timing to detect the remaining power and displays the result. The system main section can determine the occurrence of an error when no response is received, resulting in confirmation that the battery has run out in the controller section.

40 Claims, 7 Drawing Sheets

BATTERY VOLTAGE DISPLAY APPARATUS FOR WIRELESS COMMUNICATION SYSTEM

FIELD OF THE INVENTION

The present invention relates to a battery voltage display apparatus for use in a wireless communication system incorporating a battery-powered first device and a second device in which a display section is disposed to display information on the battery voltage of the first device, wherein the wireless communication system is, typically, a system that incorporates a remote controller or a wireless keyboard.

BACKGROUND OF THE INVENTION

Conventionally, battery-powered controller devices, such as a remote controller and a wireless keyboard, that establish wireless communication with a device to be controlled have been in wide use to facilitate frequent and remote accesses to the controlled device by the user and to free the user from constraints on mobility and location.

The battery mounted in the controller device, needless to say, should be replaced or charged as it wears out and fails to power the controller device. Therefore, desirably, the controller device is equipped with a capability to display a warning to urge the user to replace or charge the battery when the battery has worn out and needs to be replaced or charged, or preferably, before the battery has worn out but needs to be replaced or charged shortly.

Taking Japanese Laid-Open Patent Application No. 6-153268/1994 (Tokukaihei 6-153268; published on May 31, 1994), Japanese Laid-Open Patent Application No. 6-245281/1994 (Tokukaihei 6-245281; published on Sep. 2, 1994), and Japanese Laid-Open Patent Application No. 9-331585/1997 (Tokukaihei 9-331585; published on Dec. 22, 1997) disclosing battery life display apparatuses as examples of conventional technology, as shown in FIG. 7, if the user operates a remote controller 103 (that is, if "YES" is chosen in S101b in FIG. 8), in the remote controller 103, a voltage detection circuit 141 composed of an AD converter and other components converts the divisional voltage value of the output voltage of a battery 131 from analogue to digital so that a microcomputer 143 detects the remaining power of the battery 131 according to the converted value (S102b). Further, the microcomputer 143 causes a transmission section 144 to transmit a battery voltage code denoting the result of the detection, as well as a key operation code, to a system main section 105 (S103b).

Meanwhile, in the system main section 105, if a receiving section 161 receives a signal (if "YES" is chosen in S101a), a microcomputer 162 judges the remaining power of the battery 131 based on the received signal to carry out a display on a source voltage display section 151.

Steps S101b through S103b and S101a through S102a are repeated for every key input; the remote controller 103 detects the voltage of the battery 131 and transmits a battery voltage code in response to every key input.

In the conventional battery voltage display apparatus, the detection of the battery voltage and the transmission of the result of the detection are repeated for every key operation. This increases power consumption by the remote controller, and decreases operational time of the whole wireless communication system.

Specifically, composed of analogue circuits, such as a differential amplifier and an AD converter, the voltage detection circuit 141 typically monitors an output voltage of the battery 131 to detect a drop in the voltage exceeding a certain value. Moreover, one of the analogue circuits is a constant current circuit provided in an amplifier, and another is a resistance division circuit used for generation of a reference voltage. A steady current is flowing through these circuits. The voltage detection circuit 141 is also powered by the battery 131; the steady power consumption by the voltage detection circuit 141 wears out the battery 131. The voltage detection circuit 141 consumes electric power supplied by the battery 131 also when it detects the output voltage of the battery 131; if the more often the detection is conducted, the more quickly the battery 131 wears out.

Moreover, as the result of the detection is transmitted from the transmission section 144 to the system main section 105, the transmission section 144 consumes more electric power than the electric power consumed during reception and the electric power consumed by the microcomputer 143. Therefore, the battery 131 quickly wears out if the result of the detection of the battery voltage is transmitted often, for example, in response to every key operation.

In addition, the battery voltage is continuously monitored with the result being transmitted, even when the system main section 105 does not need detection of the battery voltage any longer, for example, after the battery voltage has dropped below a specified voltage level and the system main section 105 has displayed a warning notifying that the battery should be replaced. This operation causes the battery 131, which is already running low in power supply, to wear out more quickly.

Here, in the battery-powered wireless communication system, the battery-powered device, such as a remote controller or a wireless keyboard, has restrictions on its dimensions and weight so as to offer better portability; the battery 131 is thus allowed only to have a small power supply capacity. Therefore, there is a great demand for a battery voltage display apparatus that can detect the remaining power of the battery on a low power consumption when incorporated in a battery-powered device.

SUMMARY OF THE INVENTION

An object of the present invention is to offer a low power consuming battery voltage display apparatus, incorporated in a wireless communication system, which is capable of precisely notifying through a display when the battery should be replaced.

In order to achieve the above object, a battery voltage display apparatus in accordance with the present invention is for use in a wireless communication system constituted by a battery-powered first device and a second device, and includes:

remaining power detection means, disposed in the first device, for detecting a remaining power of the battery; and display means, disposed in the second device, for displaying information on a battery voltage of the battery;

instruction means, disposed in the second device, for determining a timing to detect the remaining power and wirelessly instructing the remaining power detection means in the first device to detect the remaining power; and transmission means, disposed in the first device, for wirelessly notifying upon reception of the instruction the display means of a result of the detection carried out by the remaining power detection means.

According to the arrangement, in the second device where the display means is disposed, the instruction means determines a timing to detect the remaining power and wirelessly instructs the battery-powered first device to detect the remaining power. Meanwhile, in the first device, as the instruction is received, the remaining power detection means detects the remaining power of the battery, and the transmission means transmits a result of the detection. Further, in the second device, the received result of the detection is displayed by the display means as information on the battery voltage. In this manner, the second device becomes capable of displaying information on the battery voltage of the first device.

According to the arrangement, the second device where the display means is disposed gives an instruction to detect the remaining power; therefore, when the second device does not need the result of the detection of the remaining power, for example, when a display has been already carried out warning that the battery is running out shortly, unlike conventional technology whereby the first device transmits information on the battery voltage without any external instruction, the remaining power is not detected, let alone a result of detection is not transmitted. This allows the detection to be conducted less often, and also allows the first device to transmit a reduced amount of data for a reduced number of times. Note that the first device consumes a greater electric power in data transmission than in other operations. Consequently, the first device upon which strict restrictions are imposed in terms of its electric power consumption can run on a reduced electric power, thereby realizing a wireless communication system that can run for an extended period of time.

The battery voltage display apparatus including the foregoing arrangement is preferably such that the instruction means instructs the remaining power detection means to detect the remaining power when a bidirectional wireless communication path has been established between the first and second devices.

According to the arrangement, an instruction is given to detect the remaining power upon the establishment of a bidirectional wireless communication path. Because of the need to, for example, adjust electric power for transmission and to conduct negotiations, the establishment of a bidirectional wireless communication path in a wireless communication system is more power consuming than data communication carried out after the establishment of the communication path, and is likely to cause the battery to wear out. Therefore, by giving an instruction to detect the remaining power at such a timing, the battery is checked for the remaining power less often but with better efficiency with a result possibly being displayed.

The battery voltage display apparatus including any one of the foregoing arrangements is preferably such that if at least one of the first and second devices is input means for receiving a user input, the instruction means gives an instruction to detect the remaining power at predetermined first intervals while the input means is being operated, and gives an instruction to detect the remaining power at second intervals while the input means is not being operated, where the second interval is longer than the first interval.

According to the arrangement, the instruction means gives an instruction to detect the remaining power at either a first or a second interval; therefore, unlike the case where the remaining power is detected only when a bidirectional wireless communication path has been established, it is better ensured that the battery is checked for the remaining power with a result possibly being displayed, even if the bidirectional wireless communication path is established for an extended period of time (the connection period is long), and the consumption electric power during that period is likely to cause the battery to wear out. Also according to the arrangement, the intervals at which the remaining power is detected are set to differing values during an operational period when the first device consumes a relatively high electric power and during a non-operational period when the first device consumes a relatively low electric power; therefore, it is better ensured that the battery is checked for the remaining power during an operational period without an increase in the electric power consumed during a non-operational period, unlike identical intervals being applied in the detection of the remaining power both during an operational period and during a non-operational period.

The battery voltage display apparatus including any one of the foregoing arrangements is preferably such that error handling means, disposed in the second device, for operating in response to an error if the transmission means in the first device fails to notify the second device of the remaining power in response to the instruction given by the instruction means to detect the remaining power.

According to the arrangement, if, for example, an error occurs in the communication condition, a fault develops in the first device, or the first device does not run because the battery has worn out, the second device cannot receive a result of the detection of the remaining power from the transmission means in the first device in response to an instruction given by the instruction means to detect the remaining power. In such an event, the error handling means handles the error by, for example, instructing the display means to display the development of an error or causing another detection instruction to be transmitted to the instruction means. Here, the error handling means holds that an error has occurred if the instruction means gives an instruction to detect the remaining power with there being no response sent back from the first device; therefore, the error can be detected without a problem despite that, possibly, an error may occur in the communication condition and a fault may develop in the first device. Hence, it is better ensured that the wireless communication system displays the information on the battery voltage of the first device.

The battery voltage display apparatus including any one of the foregoing arrangements is suitably used for a wireless communication system where one of the first and second devices is a keyboard for wirelessly notifying the other of the first and second devices of a key input.

According to the arrangement, the electric power consumption by the first device can be reduced; therefore, the wireless communication system, incorporating a keyboard, can run for an extended period of time in comparison to conventional wireless communication systems.

The battery voltage display apparatus including any one of the foregoing arrangements is suitably used for a wireless communication system where the first device is a remote controller for wirelessly notifying the second device of an operation instruction to be given to the second device.

According to the arrangement, the electric power consumption by the remote controller can be reduced; therefore, the wireless communication system, incorporating a remote controller, can run for an extended period of time in comparison to conventional wireless communication systems. Also according to the arrangement, information on the battery voltage of the remote controller is displayed by the second device, that is a device to be controlled, rather than by the remote controller upon which strict restrictions are imposed for lighter weight and smaller dimensions;

therefore, the remote controller can be reduced in terms of dimensions and weight without sacrificing an easy-to-see display. Consequently, the wireless communication system is easy to use.

For a fuller understanding of the nature and advantages of the invention, reference should be made to the ensuing detailed description taken in conjunction with the accompanying drawings.

DESCRIPTION OF THE EMBODIMENTS

Figure 1:
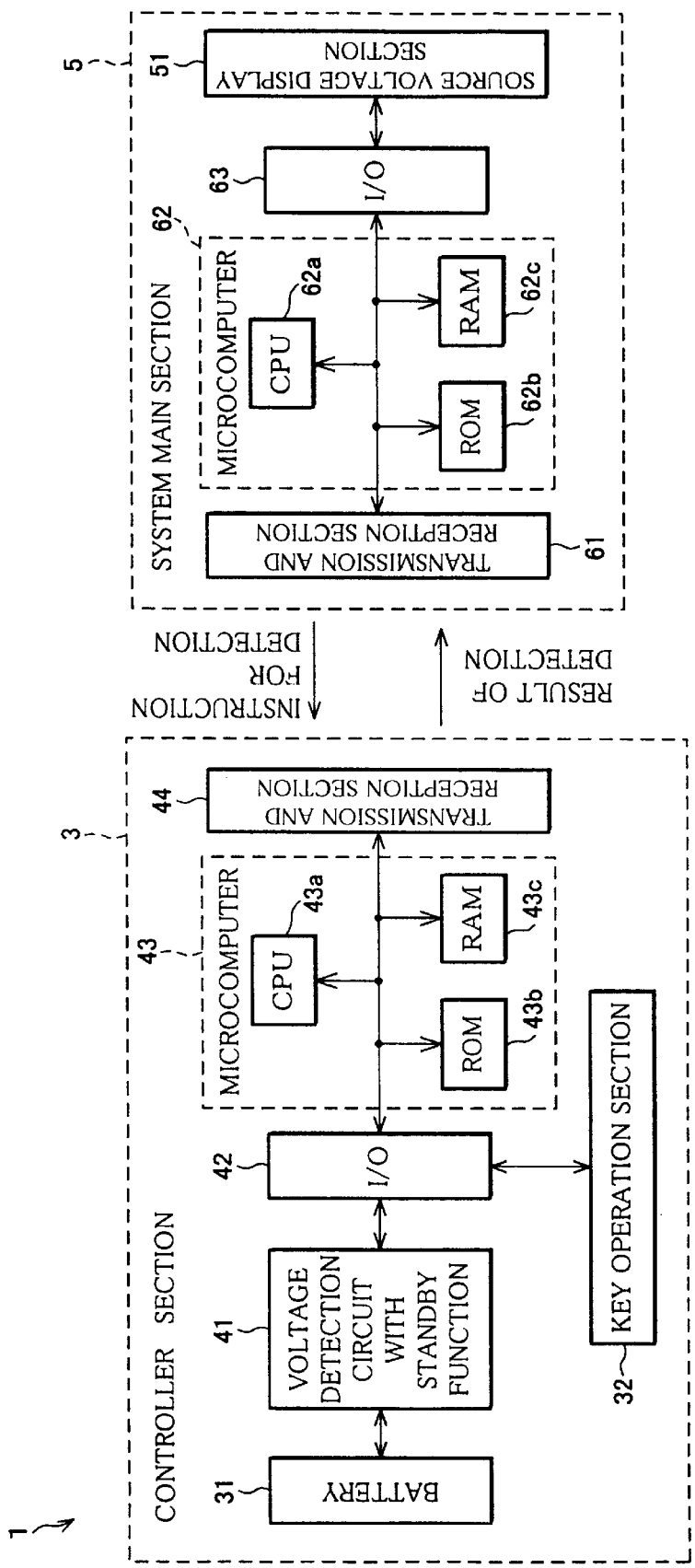
FIG. 1, illustrating an embodiment of the present invention, is a block diagram showing major parts of a wireless communication system that includes a battery-powered controller section and a system main section that can display information on the battery voltage.

Referring to FIGS. 1 through 6, the following description will discuss an embodiment in accordance with the present invention. As shown in FIG. 1, a wireless communication system 1 of the present embodiment is provided with a controller section 3 and a system main section 5 that functions in accordance with an input operation that is made at the controller section 3 and transmitted through bidirectional wireless communication with the controller section 3. The controller section 3 has a key operation section 32 and is powered by a battery 31. Examples of the controller section 3 include a remote controller and a wireless keyboard. Examples of the system main section 5 include an air conditioner and a computer. The wireless communication system 1 allows its user to operate the system main section 5 through the operation of the controller section 3 with relatively few constraints on the location of the user; by contrast, if the controller section 3 was linked to the system main section 5 through wires, the user would be restricted in terms of his location by the configuration and length of those wires liking the controller section 3 to the system main section 5. Note that FIG. 1 shows an arrangement where the controller section 3 corresponds to those first device and input means that are recited in claims, and the system main section 5 corresponds to that second device that is recited in claims. The controller section 3 and the system main section 5 constitute a battery voltage display apparatus for the wireless communication system.

Further, the system main section 5 is provided with a source voltage display section (display means) 51 composed of a display device, such as a photodiode or a liquid crystal display device. As a result of the detection of the battery voltage of the battery 31 is transmitted from the controller section 3, the system main section 5 displays information on the battery voltage of the battery 31, such as whether or not the battery 31 has completely run out, or how much the remaining power of the battery 31 is. The arrangement allows relocation of means for displaying information on the battery voltage from, for example, the controller section 3 and other devices that are powered by the battery 31 and therefore strongly required to cut down on power consumption and that are also restricted in terms of their dimensions and weight to make them more portable. Consequently, in the wireless communication system 1, the controller section 3 is relatively small in dimension and light in weight and runs on a reduced electric power, whereas the information on the battery voltage of the battery 31 can still be displayed to urge the user to replace or charge the battery 31.

Besides, in the wireless communication system 1 of the present embodiment, the system main section 5 instructs the controller section 3 to detect the battery voltage of the battery 31. In response to the instruction given by the system main section 5, the controller section 3 detects the battery voltage of the battery 31. Therefore, when the system main section 5 does not use the result of the detection of the battery voltage, for example, when the source voltage display section 51 is already displaying a warning that the battery 31 is running out shortly or temporarily suspending a display of information on the battery voltage, the system main section 5 does not transmit the instruction for a detection; hence, the controller section 3 does not detect the battery voltage, let alone transmit a result of the detection. This arrangement results in less frequent detection as well as less frequent transmission of the result of the detection, compared to an arrangement where the controller section 3 detects the battery voltage without any external instruction and irrespective of the condition of the system main section 5. Power consumption by the controller section 3 is thereby greatly reduced.

In addition, when new information on the battery voltage is necessary, for example, when the information on the battery voltage stored in a memory (e.g., an RAM 62c described later) in the system main section 5 has evaporated due to blackout, the system main section 5 can newly instructs the controller section 3 to detect the battery voltage. As a result, it is better ensured that a display of information on the battery voltage is carried out, compared to an arrangement where the controller section 3 detects the battery voltage without any external instruction and irrespective of the condition of the system main section 5.

More specifically, the controller section 3 of the present embodiment is provided with a voltage detection circuit (remaining power detection means) 41 for detecting the battery voltage of the battery 31, an I/O 42 connected to the key operation section 32 and to the voltage detection circuit 41, a microcomputer 43 connected to the I/O 42, and a transmission and reception section (transmission means) 44 for establishing bidirectional communication with the system main section 5 through a wireless communication path, for example, infrared rays or electric wave.

The voltage detection circuit 41 is capable of operating in a standby mode. In response to an instruction given by the microcomputer 43, the voltage detection circuit 41 detects the output voltage of the battery 31 and supplies the result to the microcomputer 43. When there is no instruction given, the voltage detection circuit 41 operates in a standby mode, consuming less electric power than when it is detecting the voltage. Specifically, the voltage detection circuit 41 changes to a standby mode, for example, by disconnecting itself from the power supply or by disconnecting a steady current path, for example, the path between the output terminal of the battery 31 and a divisional resistance, using a switch. Hence the power consumption by the controller section 3 can be reduced when it operates in a standby mode, compared to an arrangement where a steady current always runs through the voltage detection circuit 41.

The resolution of the detection of a battery voltage by the voltage detection circuit 41 is specified to a value required by the source voltage display section 51 in the system main section 5 so as to display information on the battery voltage. For example, when the source voltage display section 51 displays, as information on the battery voltage, only whether or not the battery 31 needs replacement or charging, the voltage detection circuit 41 only needs to be able to judge whether or not the output voltage of the battery 31 exceeds a predetermined threshold value. In this case, the threshold value is preferably specified to be slightly greater than the lowest voltage value at which the controller section 3 can operate, so that the user is urged to replace or charge the battery 31 before the controller section 3 stops operating.

The microcomputer 43 is provided with a CPU 43a, a ROM 43b, and a RAM 43c. By executing programs stored in the ROM 43b while referring to the RAM 43c so as to control the I/O 42, the transmission and reception section 44, etc., the CPU 43a operates in response to an instruction for voltage detection, discriminates between operations made at the key operation section 32, and performs various other tasks.

Meanwhile, the system main section 5 is provided with a transmission and reception section 61 for establishing communication with the transmission and reception section 44, a microcomputer (instruction means) 62, and an I/O 63 interposed between the microcomputer 62 and the source voltage display section 51.

Similarly to the microcomputer 43, the microcomputer 62 is provided with a CPU 62a, a ROM 62b, and a RAM 62c, and performs various tasks by executing programs stored in the ROM 62b while referring to the RAM 62c so as to control the I/O 63, the transmission and reception section 61, etc. However, the microcomputer 62 is different from the microcomputer 43 in that the former determines a timing of instruction for voltage detection, gives an instruction to transmit a detection instruction, gives an instruction to display information on the battery voltage according to a received result of detection, and performs other tasks, as detailed later. Further, the microcomputer 62, which is in charge of controlling the system main section 5 as a whole, operates correspondingly to the usage of the system main section 5; for example, the microcomputer 62 controls temperature if used for an air conditioner and carries out numeric calculations if used for a computer.

Here, before explaining an operation to carry out a display of information on the battery voltage, a data transmission operation, including data transmission of information on the battery voltage, will be discussed in the following in reference to FIG. 2. In step 1 (hereinafter, will be abbreviated as "S1"), a bidirectional wireless communication path that will be actually used for communication in S2 is established between the controller section 3 and the system main section 5. In S2, the controller section 3 and the system main section 5 mutually transmit and receive data, such as a key input, a request for detection of the battery voltage, and a result of the detection (will be discussed later in detail), through this communication path. The communication path is disconnected in S3 when there is no more data to be transmitted between the controller section 3 and the system main section 5, for example, when key input is completed.

More specifically, in aforementioned S1, the device that is going to transmit data transmits a signal requesting for a bidirectional wireless communication path to be established; the device that has received the signal sends a signal for establishing a communication path as a response. Then, further procedures, for example, to select a communication protocol through negotiations and to adjust electric power for transmission, are taken as necessary to realize communication in S2.

In the present embodiment, an ID code is allocated to each device that constitutes the wireless communication system 1 so as to discriminate it from the other devices, enabling the wireless communication system 1 to establish communication between a plurality of system main bodies 5 and a plurality of controller sections 3, between a single system main section 5 and a plurality of controller sections 3, and between a plurality of system main bodies 5 and a single controller section 3, as well as between a single system main section 5 and a single controller section 3. In S1, the devices exchange their ID codes with each other to identify each other.

A transmission of a key operation is taken as an example; as a key on the key operation section 32 in the controller section 3 is pressed, in S2, the microcomputer 43 recognizes the key operation and executes the step to transmit the operation to the system main section 5. Specifically, the microcomputer 43 converts the key operation code representing the operated key into binary digits after attaching a header including the ID code of the controller section 3 to the key operation code, and transmits the binary digits through the transmission and reception section 44. Meanwhile, in the system main section 5, the microcomputer 62 decodes a signal received through the transmission and reception section 61, identifies the controller section 3 where the signal originated, and recognizes the transmitted content, so as to execute steps correspondingly to the identification of the controller section 3 and the transmitted content. In this case, since a key operation code is transmitted, the microcomputer 62 holds that a key corresponding to the key operation code is pressed, and executes steps according to the key input so as to, for example, edit a text.

The key operation code is transmitted every time a key is pressed. The controller section 3 sequentially transmits signals corresponding to key inputs. No signal is transmitted when no key input is made.

Then, if no key input is made for a predetermined period of time, or if an operation that gives an instruction to disconnect the communication path, for example, an end operation of key input, is executed, the bidirectional wireless communication path is disconnected in S3 by, for example, one of the two devices involved in the communication transmitting a signal requesting the other device to disconnect the bidirectional wireless communication path or the two devices disconnecting the communication individually.

The controller section 3 and the system main section 5 are preferably capable of changing into a standby mode where less electric power is consumed than in an normal operation, so as to reduce power consumption while they are not carrying out a normal operation, such as the communication operation in S2 by, for example, deactivating the respective systems. In such an event, the controller section 3 activates the system of the controller section 3 in response to, for example, a first key operation to execute S1, and the system main section 5 activates the system of the system main section 5 on reception of a signal requesting the communication path of S1 to be established so as to execute S1. Meanwhile, In S3, the controller section 3 and the system main section 5 change to a standby mode by deactivating the respective systems when they are not in charge of other operations. In standby mode, the system needs to monitor for only specific events that represent activation of the system, such as a key input and a reception of a signal requesting a communication path to be established; therefore power consumption can be reduced.

Figure 3:
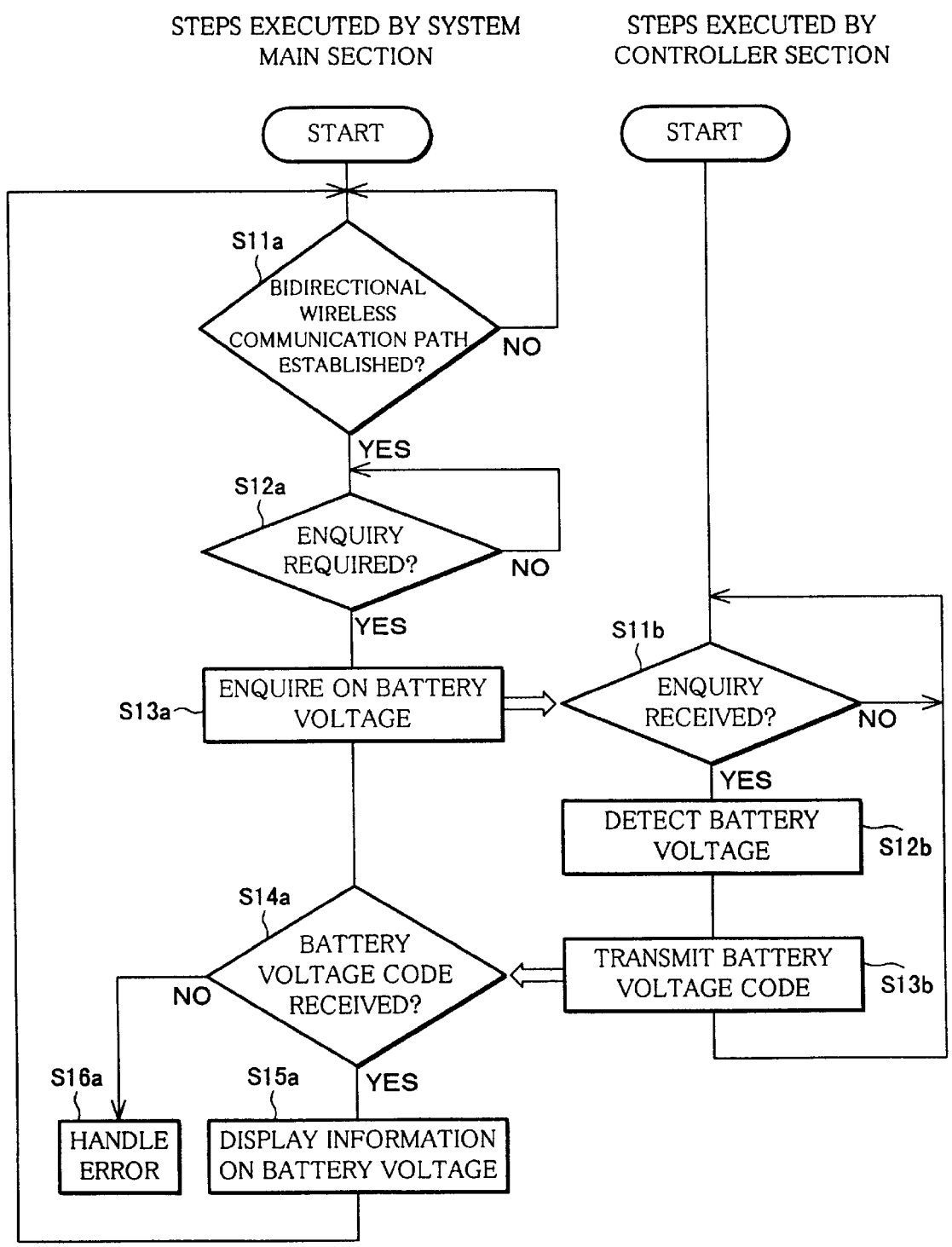
FIG. 3, referring to the wireless communication system, is a flow chart showing the steps of displaying information on the battery voltage.

Subsequently, an operation for the wireless communication system 1 to display information on the battery voltage will be discussed in reference to FIG. 3. Note that in FIG. 3, for convenience, the steps executed by the system main section 5 are discriminated from those executed by the controller section 3, by denoting the former with a suffix "a" added to the reference numbers as in "S11a" and denoting the latter with a suffix "b" added to the reference numbers.

If a bidirectional wireless communication path has been established ("YES" in S11a), the system main section 5 judges in S12a whether or not an enquiry on the battery voltage needs to be sent. If the enquiry needs to be sent ("YES" in S12a), the system main section 5 transmits a message carrying an enquiry on the battery voltage in S13a.

Figure 4:
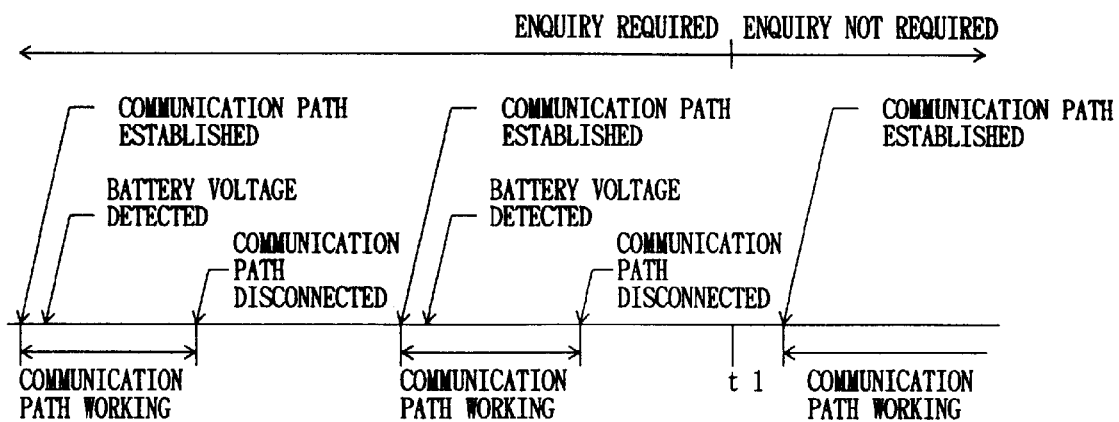
FIG. 4 is an explanatory drawing showing timings for the system main section to make an enquiry on the battery voltage with the controller section.
Figure 5:
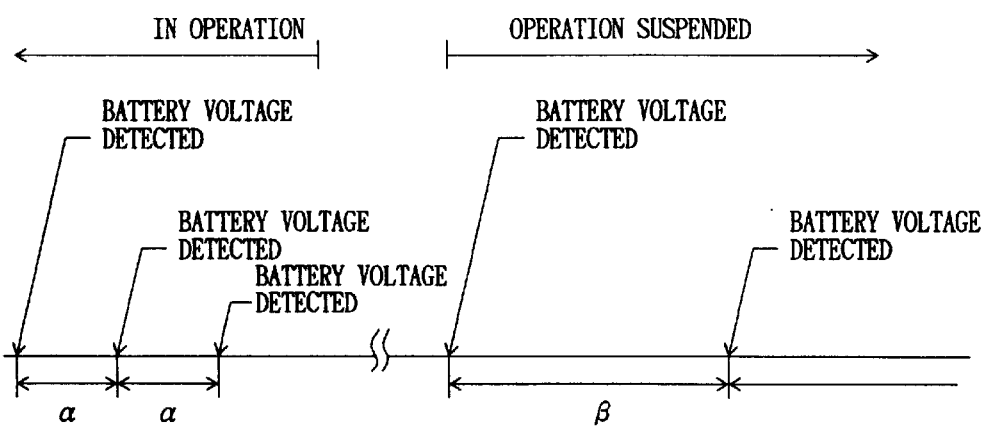
FIG. 5 is an explanatory drawing showing timings for the system main section to make an enquiry on the remaining battery power with the controller section, by way of enquiry intervals during an operational period and during a non-operational period.
Figure 6:
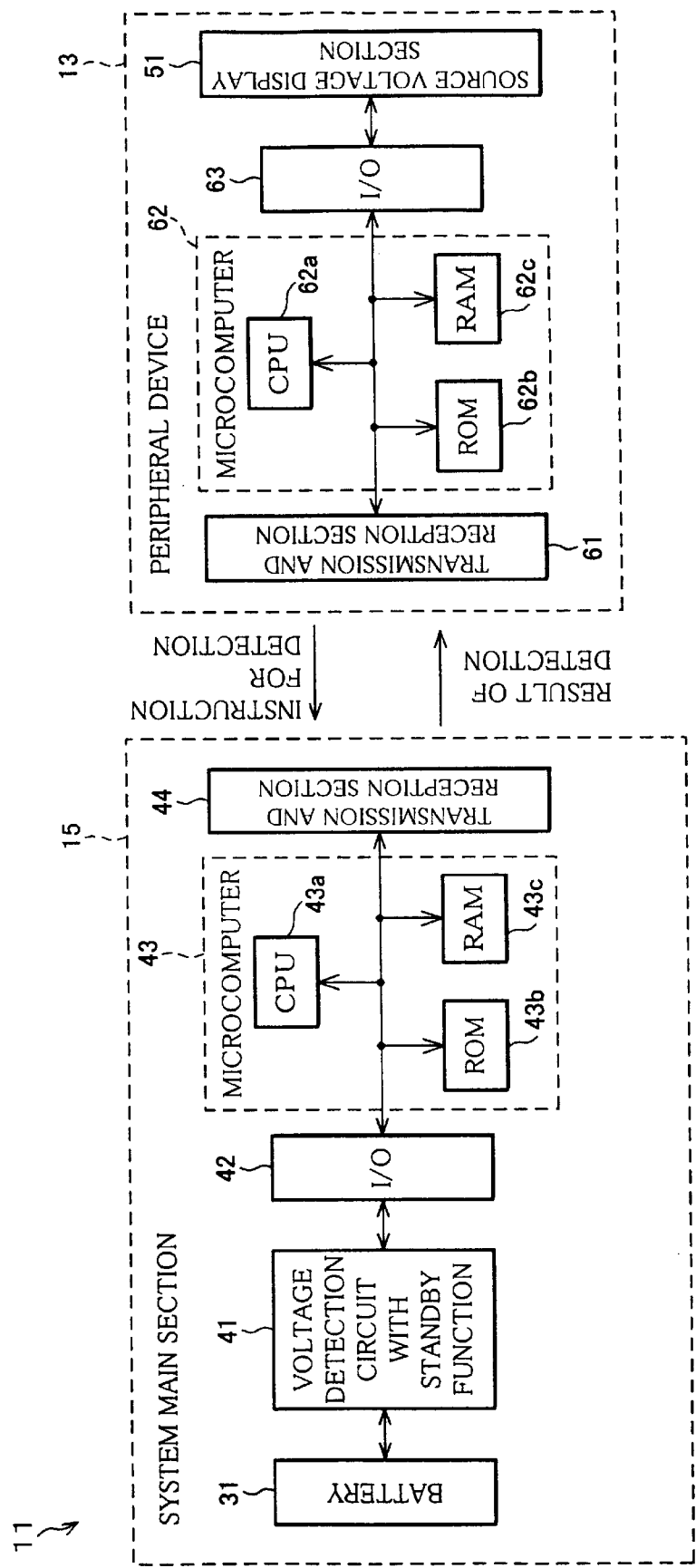
FIG. 6, illustrating a modification of the wireless communication system, is a block diagram showing a controller section making an enquiry on the remaining battery power with a battery-powered system main section.
Figure 7:
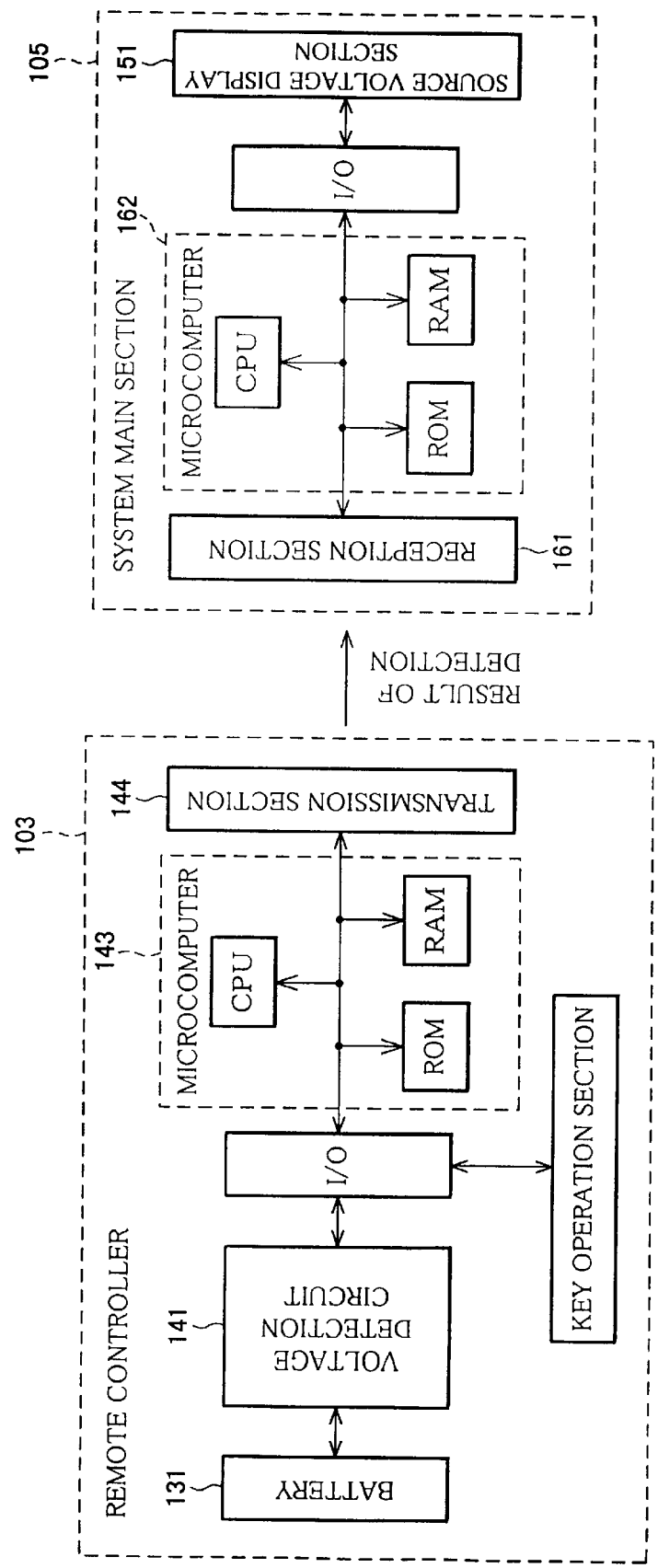
FIG. 7, illustrating a conventional example, is a block diagram showing major parts of a wireless communication system that includes a battery-powered controller section and a system main section that can display information on the battery voltage.
Figure 8:
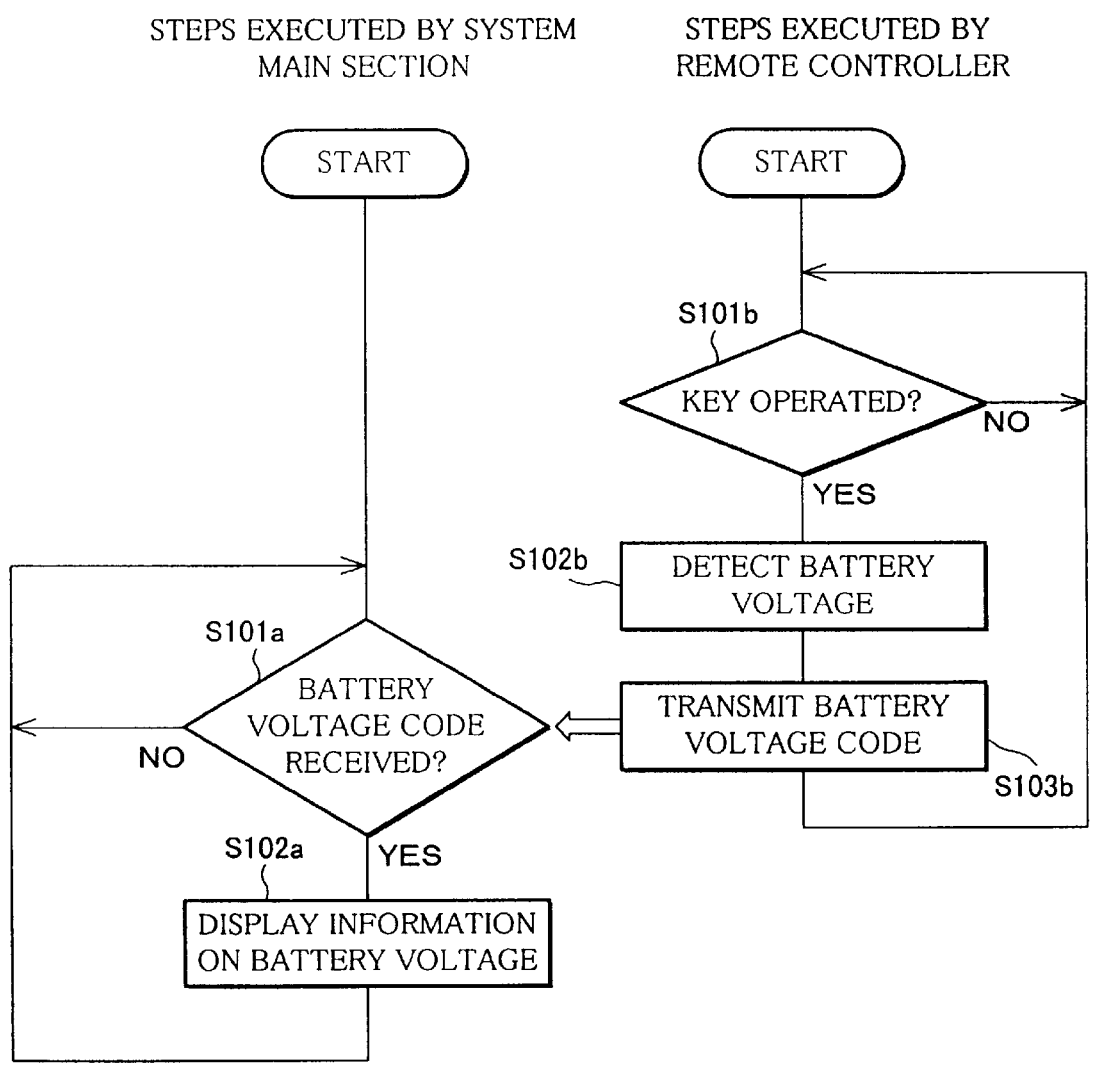
FIG. 8 is a flow chart showing operations of the system main section and the controller section in the wireless communication system.

In the present embodiment, the system main section 5 is specified to send an enquiry immediately after the establishment of a bidirectional wireless communication path as shown in FIG. 4 (upon reception of a signal to establish a communication path from the controller section 3 in S1). The system main section 5 sends an enquiry on the battery voltage, for example, about one second after the first key input is made.

Meanwhile, the controller section 3 stands by until the message is received in S11b. If the message is received ("YES" S11b), the microcomputer 43 instructs the voltage detection circuit 41 to detect the battery voltage of the battery 31 in S12b. Then the microcomputer 43 converts the battery voltage code representing the result of the detection by the voltage detection circuit 41 into binary digits after attaching a header including the ID code of the controller section 3 to the battery voltage code, and transmits the binary digits through the transmission and reception section 44. When there is additional data to be transmitted from the controller section 3, for example, during key input, the battery voltage code and that additional data may be converted into binary digits together. In such an event, the header may be commonly shared, effectively reducing the amount of data that needs to be transmitted in comparison to separately transmitting the battery voltage code and the additional data. Consequently, the power consumption by the controller section 3 is reduced.

If the system main section 5 receives a signal representative of a battery voltage code ("YES" in S14a), the microcomputer 62 decodes the signal in S15a, identifies the controller section 3 where the signal originated, and recognizes the battery voltage code, so as to display information on the battery voltage on the source voltage display section 51 correspondingly to the identification of the controller section 3 and the battery voltage code. This arrangement allows the user of the wireless communication system 1 to confirm through a display on the source voltage display section 51 of the system main section 5 whether or not the battery 31 in each controller section 3 needs either charging or replacement.

Meanwhile, if a predetermined period of time has elapsed from the transmission in S13a of the enquiry on the battery voltage by the system main section 5 without the controller section 3 returning any battery voltage code ("NO" in S14a), the microcomputer 62 holds that an error has occurred, and operates in response to that error in S16a, for example, retransmits the enquiry or displays a warning about the error. Here, since the wireless communication path often breaks down temporarily, such a display is carried out preferably only after the enquiry is retransmitted at least once, or more preferably only after the enquiry is retransmitted a predetermined number of times at predetermined intervals without receiving any response. This arrangement allows the user to be notified by the system main section 5 of a failure for the controller section 3 to operate normally due to a wearing battery 31 and also of a failure occurring to the communication path. Consequently, it is better ensured that the user is urged to replace or charge the battery 31, compared to a case where the user is urged to replace or charge the battery 31 only when the user is notified by the controller section 3 of the wearing battery 31. Note that when a failure occurs to the communication path and hinders the enquiry message from arriving at the controller section 3, since neither detection nor transmission is carried out in the controller section 3, the controller section 3 does not consume any electric power.

Further, if a bidirectional wireless communication path has not been established ("NO" in S11a), the system main section 5 stands by until a communication path is established. If no enquiry needs to be sent ("NO" in S12a), the system main section 5 stands by until a need for an enquiry arises. In these events, the system main section 5 does not send an enquiry, and the controller section 3 does not detect the battery voltage, let alone transmit a result of the detection as during the period after t1 in FIG. 4. Consequently, the power consumption by the controller section 3 is reduced. Especially, the transmission operation in S13b is more power consuming than reception, calculation and other operations. The battery 31 in the controller section 3 therefore quickly wears out correspondingly to an increased amount of data to be transmitted and increasingly frequent transmissions. Therefore, the power consumption by the controller section 3 can be greatly reduced by reducing the number of transmissions.

If the system main section 5 is set not to make an enquiry while it is already displaying that the battery 31 is running out, there is a likelihood that the system main section 5 continues to display that message even after the battery 31 has been replaced or charged; therefore, the user preferably operates the controller section 3 or the system main section 5 (either section constitutes restarting instruction means) to notify the system main section 5 that the battery 31 has been replaced or charged after doing so, as an instruction to restart the enquiry. In such an event, the battery 31, having been just replaced or charged, has an enough electric power to power the controller section 3 carrying out excessive communication.

In the foregoing, the discussion has been based on an assumption that the system main section 5 makes an enquiry on the battery voltage immediately after the bidirectional wireless communication path is established. However, this is not the only possibility; the system main section may make an enquiry anytime in accordance with the design by the system designer as long as the bidirectional wireless communication path is established. Enquiry timings may be, for example, periodic (e.g., every 10 to 20 minutes for a low power-consuming device) or "event" responsive (e.g., when a device with a suspension mode returns to normal operation from a suspension mode).

Figure 2:
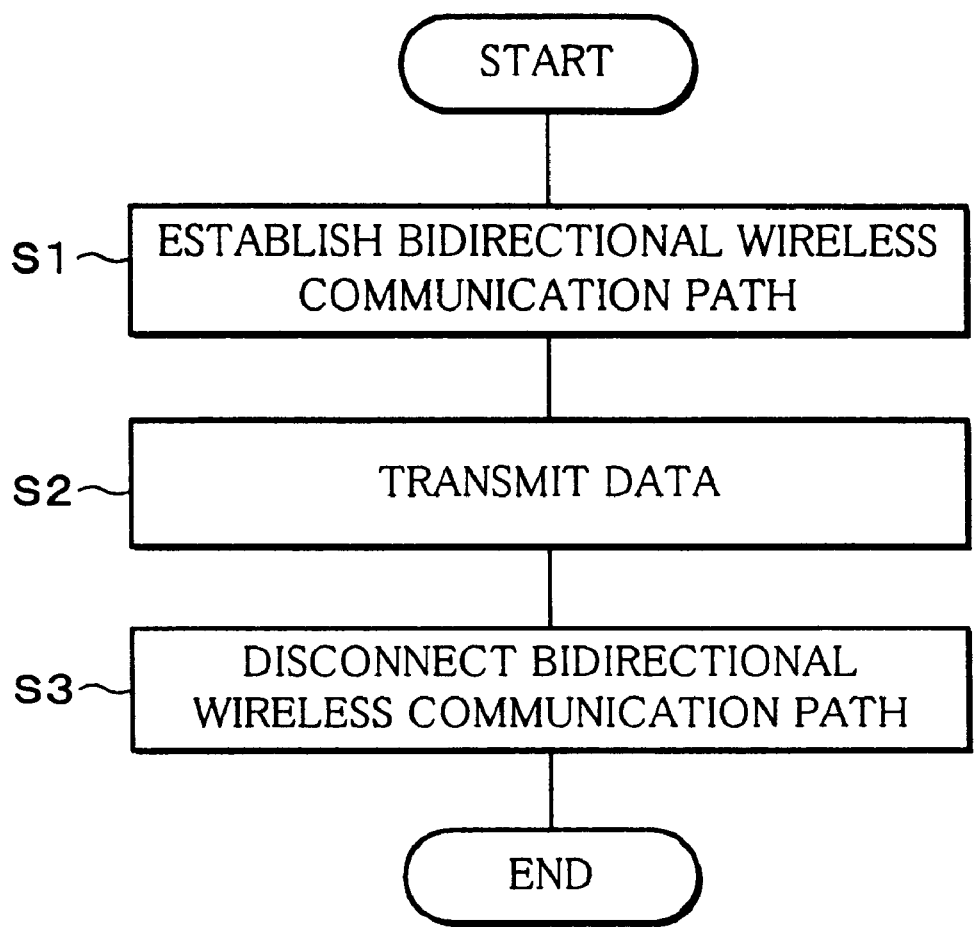
FIG. 2, referring to the foregoing wireless communication system, is a flow chart illustratively showing the steps of transmitting data.

However, since the establishment of a bidirectional wireless communication path in S1 shown in FIG. 2 requires negotiations, adjustment of electric power for transmission, etc. as previously mentioned, the controller section 3 consumes more electric power for the establishment than in the normal data communication in S2, and the battery 31 runs out most quickly. Consequently, the battery is highly likely to wear out completely right after the establishment of a bidirectional wireless communication path. Therefore, the battery 31 can be checked for the remaining power efficiently with a relatively few enquiries if enquiries are made right after a bidirectional wireless communication path is established.

Especially, if the controller section 3 changes into a standby mode when the bidirectional wireless communication path is being disconnected, and the system of the controller section 3 starts up when a communication path is established as in the present embodiment, the extra workload for the starting up generally forces the controller section 3 to consume more electric power than any other time. Therefore, an enquiry made at this timing is very effective.

As previously mentioned, if an enquiry is made on the battery voltage when a bidirectional communication path has been established, the battery can be checked for the remaining electric power more efficiently than at the other timings. However, if the bidirectional communication path is maintained for a long period of time (a long connection time), the battery is more likely to wear out during that period. Consequently, if an enquiry is made only right after a bidirectional wireless communication path has been established, and the connection time becomes longer, the battery 31 is likely to completely wear out and fail to power the controller section 3 before information on the battery voltage is displayed to urge the user to replace or charge the battery 31.

Therefore, if the connection time is long, and the battery 31 is likely to wear out during that period, an enquiry is preferably made during the connection time. The likelihood of the battery wearing out can be calculated approximately from the length of the connection period, the electric power consumption during the connection time, and the power supply capacity of the battery 31, which are all estimated from the usage of the controller section 3.

Enquiries may be made during the connection period at certain intervals; however, frequent enquiries are preferably made while a key is being operated (an operational period) rather than while no key is being operated (a non-operational period), since the controller section 3 consumes relatively large power for transmission as previously mentioned. Specifically, as shown in, for example, FIG. 5, during the operational period, an enquiry is made at every predetermined interval $\alpha$. During the non-operational period, an enquiry is made at every interval $\beta$ that is longer than the interval $\alpha$ for the operational period. This arrangement allows the battery voltage to be detected during the operational period at every interval $\alpha$, and to be detected during the non-operational period at every interval $\beta$. Consequently, the battery can be checked for the remaining power without a large increase in the electric power consumed by the controller section 3 even when the connection time is long.

Take text input through a keyboard at the controller section 3 as an example. Key input, once started, is continuously done for a certain period of time, but stopped while the user is reflecting on a next word or phrase to input, resulting in an operational period and a non-operational period appearing alternately. Therefore, enquiries are made effectively at two different intervals when the controller section 3 is equipped with a keyboard.

Further, if the bidirectional wireless communication path is not established for a long period of time (a non-connection period), and the battery is likely to wear out during that period due to power consumption by the controller section 3, the battery voltage may be detected at, for example, every predetermined interval. However, in such an event, an enquiry requires a new bidirectional wireless communication path to be established and then disconnected, resulting in an extremely larger power consumption than during a non-connection period. Therefore, the interval in such an event is set longer than the interval $\beta$, more specifically, longer than at least the length of time during which the controller section 3 in a non-connection period consumes a greater electric power than the electric power X, where the electric power X is the electric power required for the controller section 3 to establish and disconnect a bidirectional wireless communication path.

In the foregoing discussion, the controller section 3 was taken as an example. The same advantages are obtainable with other peripheral devices that do not have a key operation section 32 as long as the peripheral devices are capable of communicating with the system main section 5 in both directions. However, an input device, such as a wireless keyboard or a remote controller, for instructing a system main section to carry out an operation only needs to notify of the operation and therefore includes a circuit that consumes less electric power to realize its original function, i.e., the function to notify of the operation, than peripheral devices, such as CD-ROM drivers, that have a drive section. The input device is therefore in many cases designed to include a battery of a limited power supply capacity so as to reduce the dimensions and weight. Therefore, the present invention is especially effective when applied to a peripheral device that is one of the above input devices.

Further, in the foregoing discussion, the controller section 3 powered by the battery 31 was taken as an example. The same advantages are obtainable with an "opposite" arrangement as in, for example, the wireless communication system 11 shown in FIG. 6, where the system main section 15 is powered by the battery 31 and a peripheral device 13 displays information on the battery voltage of the battery 31. In this arrangement, the system main section 15 corresponds to that first device that is recited in claims, and the peripheral device 13 to that second device that is also recited in claims. In this case, the battery 31 as well as the voltage detection circuit 41 through transmission and reception section 44 are disposed in the system main section 15, and the source voltage display section 51 as well as the transmission and reception section 61 through I/O 63 are disposed in the peripheral device 13. Steps S11a through S16a shown in FIG. 3 are carried out by the peripheral device 13, whereas Steps S11b through S13b are carried out by the system main section 15.

In either case, the same advantages are obtainable as the present embodiment, as long as information on the battery voltage of the battery 31 powering the first device (the controller section 3 or the system main section 15) is displayed on the second device (the system main section 5 and the peripheral device 13) that wirelessly communicates with the first device, and the second device makes an enquiry on the battery voltage with the first device.

Further, in the foregoing discussion, the second device, incorporating the source voltage display section 51, that is powered by a commercial power supply was taken as an example. The second device may be powered by a battery. In such an event also, when a result of the detection on the battery voltage is not used in the second device, since the first device does not detect the battery voltage, let alone transmit a result of the detection, the consumption electric power by the first device can be reduced, allowing the wireless communication system to operate for an extended period of time.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A battery voltage display apparatus, for a wireless communication system, the battery voltage display apparatus including an input device, powered by a battery, having an input section for accepting entry of input and a transmission section for wirelessly transmitting the input, and a system main section having a receiving section for receiving transmission of the transmission section,
   wherein:
   the system main section includes:
      a display section for displaying battery voltage information of the battery;
      a timing instruction section for deciding a timing of instructions the input device to detect remaining power;
      a main section transmission section for wirelessly transmitting the instructions for remaining power detection to the input device, and
   the input device includes:
      an input receiving section for receiving the instructions for remaining power detection;
      a remaining power detection circuit for detecting remaining power of the battery in receipt of the instructions for remaining power detection, and for transferring a result of detection to the display section via the transmission section and the receiving section.

2. The battery voltage display apparatus as set forth in claim 1, wherein
   if the result of the detection is not used, the timing instruction section stops the transmission of the instructions for remaining power detection by the main section transmission section.

3. The battery voltage display apparatus as set forth in claim 1, wherein
   if the display is already displaying a warning that the battery is running out shortly, the timing instruction section stops the transmission of remaining power detection by the main section transmission section.

4. The battery voltage display apparatus as set forth in claim 3, wherein
   the input device includes a restarting instruction section for, when the battery has been replaced or charged, notifying the timing instruction section and restarting the transmission of the instructions for remaining power detection.

5. The battery voltage display apparatus as set forth in claim 1, wherein
   if the display section is suspending a display of the information on the battery voltage, the timing instruction section stops the transmission of the instructions for remaining power detection by the main section transmission section.

6. The battery voltage display apparatus as set forth in claim 1, wherein
   the display section includes a memory for storing the information on the battery voltage, and
   the timing instruction section causes transmission of the instructions for remaining power detection to the main section transmission section when the information on the battery voltage stored in the memory is lost.

7. The battery voltage display apparatus as set forth in claim 1, wherein
   the timing instruction section causes transmission of the instructions for remaining power detection to the main section transmission section when a bidirectional wireless communication path is established between the input device and the system main section.

8. The battery voltage display apparatus as set forth in claim 1, wherein
   the timing instruction section causes the main section transmission section to transmit the instructions for remaining power detection at a predetermined first interval while the input section is being operated, and causes the transmission of the instructions for remaining power detection at a second interval while the input section is not being operated, the second interval being longer than the first interval.

9. The battery voltage display apparatus as set forth in claim 1, the system main section further includes an error handling section for handling an error if the transmission section in the input device fails to notify a result of detection in response to the instructions for remaining power detection given by the timing instruction section.

10. The battery voltage display apparatus as set forth in claim 9, wherein
    the error handling section causes the main section transmission section to retransmit the instructions for remaining power detection as an error handling procedure.

11. The battery voltage display apparatus as set forth in claim 10, wherein
    the error handling section causes the display section to display a warning that an error has occurred if the timing instruction section retransmits the instructions for remaining power detection a predetermined number of times without receiving any response.

12. The battery voltage display apparatus as set forth in claim 9, wherein
    the error handling section causes the display section to display a warning that an error has occurred as an error handling procedure.

13. The battery voltage display apparatus as set forth in claim 1, wherein the input device is a keyboard for wirelessly notifying the system main section of a key input.

14. The battery voltage display apparatus as set forth in claim 1, wherein
    the input device is a remote controller for wirelessly notifying the system main section of an operation instruction to be given to the system main section.

15. The battery voltage display apparatus as set forth in claim 1, wherein the remaining power detection circuit stops power supply thereto when detection of remaining power is not instructed.

16. The battery voltage display apparatus as set forth in claim 1, wherein the remaining power detection circuit blocks a constant current flow therein when detection of remaining power is not instructed.

17. A battery voltage display method for a wireless communication system constituted by an input device powered by a battery and a system main section capable of displaying a remaining power of the battery and wirelessly communicating with the input device, comprising the steps of:
(a) the system main section determining a timing to instruct the input device to detect the remaining power of the battery;
(b) the system main section instructing the input device to detect the remaining power of the battery at the determined timing:
(c) the input device detecting the remaining power of the battery in response to the instructions:
(d) the input device wirelessly notifying the system main section of a result of the detection; and
(e) the system main section displaying the remaining power of the battery in the input device based on the result of the detection.

18. The battery voltage display method as set forth in claim 17, wherein
in the step (a), the system main section designates as a timing a point in time when a bidirectional wireless communication path is established between the input device and the system main section.

19. The battery voltage display method as set forth in claim 17, wherein
the step (a) includes the sub-steps of:
judging whether the user is operating the input device and/or the system main section;
setting an interval of the timing to a predetermined first interval while the user is operating the input device and/or the system main section; and
setting an interval of the timing to a predetermined second interval while the user is operating the input device and/or the system main section, the second interval being longer than the first interval.

20. The battery voltage display method as set forth in claim 17, further comprising
the system main section handling an error if the input device fails to notify the system main section of the result of the detection after, in the step (b), the system main section instructing the input device to detect the remaining power of the battery.

21. A battery voltage display apparatus for a wireless communication system, the battery voltage display apparatus including an input device having an input section for accepting entry of input and a transmission section for wirelessly transmitting the input, and a system main section, powered by a batter, having a receiving section for receiving transmission of the transmission section,
wherein:
the input device includes:
a display section for displaying battery voltage information of the battery;
a timing instruction section for deciding a timing of instructing the system main section to detect remaining power from the transmission section; and
an input receiving section for receiving a result of detection of remaining power of the battery from the system main section, and causing the display section to display the result;
the system main section includes:
a remaining power detection circuit for detecting remaining power of the battery when the receiving section receives the instructions for remaining power detection; and
a main section transmission section for wirelessly transmitting the result of detection by the remaining power detection circuit to the input receiving section.

22. The battery voltage display apparatus as set forth in claim 21, wherein
if the result of the detection is not used, the timing instruction section stops the transmission of the instructions for remaining power detection by the transmission section.

23. The battery voltage display apparatus as set forth in claim 21, wherein
if the display section is already displaying a warning that the battery is running out shortly, the timing instruction section stops the transmission of the instructions for remaining power detection by the transmission section.

24. The battery voltage display apparatus as set forth in claim 23, wherein
the system main section includes a restarting instruction section for, when the battery has been replaced or charged, notifying the timing instruction section and restarting the transmission of the instructions for remaining power detection.

25. The battery voltage display apparatus as set forth in claim 21, wherein
if the display section is suspending a display of the information on the battery voltage, the timing instruction section stops the transmission of the instructions for remaining power detection by the transmission section.

26. The battery voltage display apparatus as set forth in claim 21, wherein
the display section includes a memory for storing the information on the battery voltage, and
the timing instruction section causes transmission of the instructions to the transmission section when the information on the battery voltage stored in the memory is lost.

27. The battery voltage display apparatus as set forth in claim 21, wherein
the timing instruction section causes transmission of the instructions for remaining power detection to the transmission section when a bidirectional wireless communication path is established between the input device and the system main section.

28. The battery voltage display apparatus as set forth in claim 21, wherein
the timing instruction section causes the transmission section to transmit the instructions for remaining power detection at a predetermined first interval while the input section is being operated, and causes the transmission of the instructions for remaining power detection at a second interval while the input section is not being operated, the second interval being longer than the first interval.

29. The battery voltage display apparatus as set forth in claim 21, wherein:

the input device includes an error handling section for handling an error if the main section transmission section in the system main section fails to notify a result of detection in response to the instructions for remaining power detection given by the timing instruction section.

30. The battery voltage display apparatus as set forth in claim 29, wherein
the error handling section causes the transmission section to retransmit the instructions for remaining power detection as an error handling procedure.

31. The battery voltage display apparatus as set forth in claim 30, wherein
the error handling section causes the display section to display a warning that an error has occurred if the timing instruction section retransmits the instructions for remaining power detection a predetermined number of times without receiving any response.

32. The battery voltage display apparatus as set forth in claim 29, wherein
the error handling section causes the display section to display a warning that an error has occurred as an error handling procedure.

33. The battery voltage display apparatus as set forth in claim 21, wherein
the input device is a keyboard for wirelessly notifying the system main section of a key input.

34. The battery voltage display apparatus as set forth in claim 21, wherein
the input device is a remote controller for wirelessly notifying the system main section of an operation instruction to be given to the system main section.

35. The battery voltage display apparatus as set forth in claim 21, wherein the remaining power detection circuit stops power supply thereto when detection of remaining power is not instructed.

36. The battery voltage display apparatus as set forth in claim 21, wherein the remaining power detection circuit blocks a constant current flow therein when detection of remaining power is not instructed.

37. A battery voltage display method for a wireless communication system constituted by a system main section provided by a battery and an input device capable of displaying a remaining power of the battery and wirelessly communicating with the system main section, comprising the steps of:

(a) the input device determining a timing to instruct the system main section to detect the remaining power of the battery;

(b) the input device instructing the system main section to detect the remaining power of the battery at the determined timing;

(c) the system main section detecting the remaining power of the battery in response to the instructions;

(d) the system main section wirelessly notifying the input device of a result of the detection; and (e) the input device displaying the remaining power of the battery in the system main section based on the result of the detection.

38. The battery voltage display method as set forth in claim 37, wherein
in the step (a), the input device designates as a timing a point in time when a bidirectional wireless communication path is established between the system main section and the input device.

39. The battery voltage display method as set forth in claim 37, wherein
the step (a) includes the sub-steps of:
judging whether the user is operating the system main section and/or the input device;
setting an interval of the timing to a predetermined first interval while the user is operating the system main section and/or the input device; and
setting an interval of the timing to a predetermined second interval while the user is operating the system main section and/or the input device, the second interval being longer than the first interval.

40. The battery voltage display method as set forth in claim 37, further comprising
the input device handling an error if the system main section fails to notify the input device of the result of the detection after, in the step (b), the input device instructing the system main section to detect the remaining power of the battery.

* * * * *